United States Patent [19]  [11] Patent Number: 4,619,564
Jacobson  [45] Date of Patent: Oct. 28, 1986

[54] BORING BAR
[75] Inventor: Mark E. Jacobson, Troy, Mich.
[73] Assignee: MLS, Inc., Troy, Mich.
[21] Appl. No.: 744,029
[22] Filed: Jun. 12, 1985
[51] Int. Cl.[4] .............................................. B23B 27/16
[52] U.S. Cl. .................................... 408/146; 408/155;
    408/178; 408/190; 408/198; 408/239 R
[58] Field of Search ............... 408/146, 154, 155, 156,
    408/185, 186, 191, 193, 197, 198, 224, 226, 238,
    239 R, 239 A, 713, 201, 178

[56] References Cited
U.S. PATENT DOCUMENTS

| | | | |
|---|---|---|---|
| 2,405,772 | 8/1946 | Adams et al. | 408/239 R |
| 2,551,948 | 5/1951 | Hutchinson | 408/226 |
| 2,913,935 | 11/1959 | Flannery et al. | 408/198 |
| 2,958,241 | 11/1960 | Wahli | 408/146 |
| 3,292,238 | 12/1966 | De Vlieg et al. | 408/226 X |
| 3,762,831 | 10/1973 | Nicholson | 408/198 X |

Primary Examiner—Gil Weidenfeld
Assistant Examiner—Glenn L. Webb
Attorney, Agent, or Firm—Gifford, Groh, VanOphem, Sheridan, Sprinkle & Dolgorukov

[57] ABSTRACT

A boring bar is disclosed having an elongated body adapted to be rotatably driven around a predetermined axis. A longitudinally extending bore is open to at least one end of the body and has an axis which intersects the body axis at an acute angle. A cutting tool has an elongated shank with a cutting edge at one end while the other end of the shank is slidably received within the bore so that the radial displacement of the cutting edge with respect to the cutting axis is directly proportional to the longitudinal position of the shank within the body bore. A nut threadably secured to the body engages a radially extending pin secured to the shank in order to adjust the longitudinal position of the shank within the bore.

5 Claims, 3 Drawing Figures

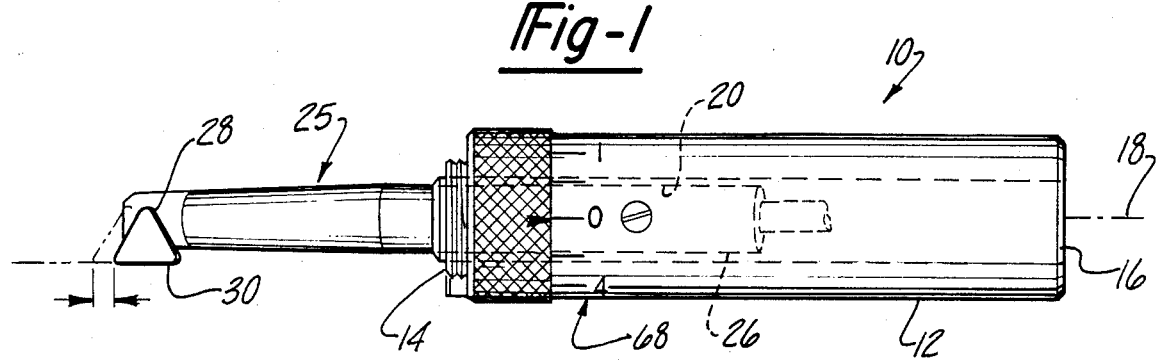
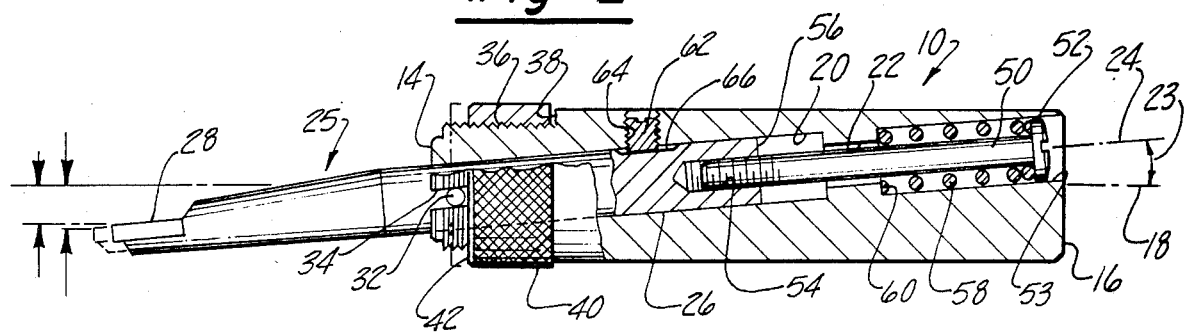
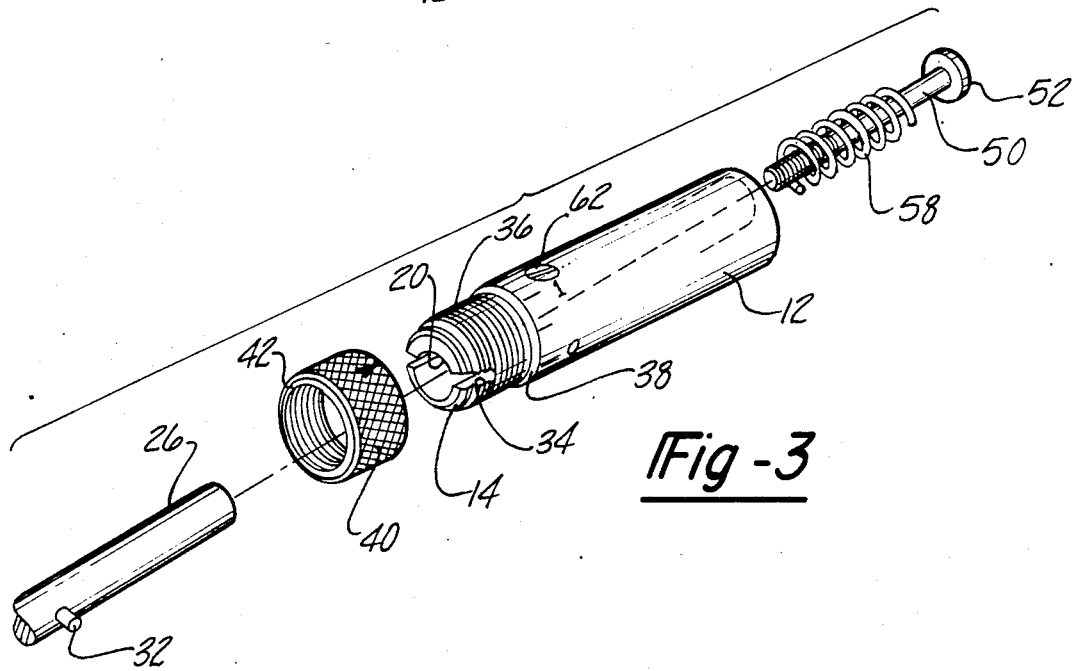

BORING BAR

BACKGROUND OF THE INVENTION

I. Field of the Invention

The present invention relates to boring bars.

II. Description of the Prior Art

There are a number of previously known boring bars which typically comprise an elongated cylindrical body adapted to be rotatably driven about a predetermined axis. A cutting insert, having a cutting edge, protrudes radially outwardly from one end of the boring bar in order to cut the hole in the workpiece.

Many of these previously known boring bars, furthermore, include means to adjust the radial position of the cutting edge with respect to the body axis and thus vary the diameter of the hole which is cut. These previously known boring bars, however, disadvantageously employ complicated means for adjusting the radial position of the cutting edge which increases the overall cost of the boring bar. Furthermore, it is very difficult for a worker to accurately adjust the boring bar to the desired hole diameter due to the complexity of the previously known adjustment means and many of these previously known boring bars are incapable of boring holes where high precision is required.

SUMMARY OF THE PRESENT INVENTION

The present invention provides a boring bar which overcomes all of the above mentioned disadvantages of the previously known devices.

In brief, the boring bar of the present invention comprises an elongated cylindrical body which is adapted to be rotatably driven about its axis. A throughbore is formed longitudinally through the body so that the axis of the throughbore intersects the body axis at an acute angle.

A cutting tool having an elongated shank is slidably received within one end of the longitudinal bore while a cutting blade having cutting edge is attached to the opposite end of the shank. Since the longitudinal bore intersects the body axis at an acute angle, the radial displacement of the cutting edge from the body axis is directly proportional to the longitudinal position of the shank within the longitudinal bore.

In order to adjust the longitudinal position of the shank within the bore, and thus the diameter of the hole bored by the cutting edge, a nut is coaxially threadably mounted to one end of the body. One axial end of the nut abuts against a pin extending radially outwardly from the shank while a spring assembly urges the pin against the nut. Consequently, rotation of the nut simultaneously longitudinally displaces the shank with its attached cutting edge with respect to the body.

Preferably, the angle between the longitudinal bore and the axis of the body is very small, for example 4-5 degrees, so that a relatively large axial displacement of the nut with respect to the body produces only a relatively small radial displacement of the cutting edge from the body axis. As such, the boring bar of the present invention is capable of boring high precision holes which are easily set by the user.

BRIEF DESCRIPTION OF THE DRAWING

A better understanding of the present invention will be had upon reference to the following detailed description when read in conjunction with the accompanying drawing, wherein like reference characters refer to like parts through the several views, and in which:

FIG. 1 is a side view illustrating a preferred embodiment of the present invention;

FIG. 2 is a longitudinal sectional view illustrating the preferred embodiment of the invention; and FIG. 3 is a fragmentary exploded view illustrating the preferred embodiment of the present invention.

DETAILED DESCRIPTION OF PREFERRED EMBODIMENTS OF THE PRESENT INVENTION

With reference first to FIGS. 1 and 2 a preferred embodiment of the boring bar 10 of the present invention is thereshown and comprises an elongated cylindrical body 12 having a front end 14 and a rear end 16. The rear end 16 of the body 12 is adapted to be inserted into a rotary drive machine (not shown) and rotatably driven about its axis 18.

A longitudinally extending bore 20 having a reduced diameter midportion 22 (FIG. 2) is formed through the body 12 so that the bore 20 is open to each end 14 and 16 of the body 12. In addition, as best shown in FIGS. 2, the bore 20 has an axis 24 which intersects the body axis 18 at an acute angle. This acute angle is preferably between four and five degrees for a reason to be subsequently described.

Referring now to FIGS. 2 and 3, the boring bar 10 further includes a cutting tool 25 having an elongated cylindrical shank 26 with a cutting member 28 having a cutting edge 30 at one end. The shank 26 is dimensioned so that it is slidably received within the bore 20 through the front end 14 of the body 12. In addition, a pin 32 is secured to and extends laterally outwardly from the shank 26 and this pin 32 is slidably received within a slot 34 in the front end 14 of the body 12. This slot 34 is parallel to the axis 24 of the bore 20 and, with the pin 32 positioned within the slot 34 as shown in FIG. 2, the pin 32 prevents rotation of the cutting tool 25 with respect to the body 12.

The front 14 of the body 12 includes a reduced diameter externally threaded portion 36 thus forming an annular abutment surface 38 at a position longitudinally spaced from the body end 14. A nut 40 is threadably mounted to the threaded body portion 36 so that one axial end 42 of the nut 40 abuts against the pin 32 when the cutting tool shank 26 is positioned within the bore 20. Thus, rotation of the nut 40 relative to the body 12 longitudinally displaces the cutting tool shank 26 along its bore 24.

As best shown in FIG. 2, since the axis 24 of the bore 22 intersects the body axis 18 at an acute angle 23, longitudinal displacement of the shank 26 within the bore 20 simultaneously radially displaces the cutting edge 30 from the axis 18 of the body 12. Furthermore, since the bore axis 24 intersects the body axis 18 at a small angle, preferably 4-5 degrees, a relatively large axial displacement of the nut 40 produces only a relatively small radial displacement of the cutting edge 30 which enables holes to be bored at high precision as will be subsequently described.

Referring again to FIGS. 2 and 3, in order to maintain the pin 32 in abutment with the end 42 of the nut 40, a screw 50 having a head 52 is positioned through the rear end 53 of the bore 20 and threadably engages an internally threaded axial bore 54 (FIG. 2) at the inner end 56 of the shank 26. Furthermore, a helical compression spring 58 is sandwiched in between the screw head 52 and an annular abutment surface 60 (FIG. 2) formed by the reduced diameter portion 22 of the bore 20. With the spring 58 in a state of compression, the spring 58 urges the shank 26 inwardly into the bore 20 and thus maintains the pin 32 in abutment with the end 42 of the nut 40.

With reference now to FIG. 2 in some manufacturing situations, for example when a hard or brittle material is to be bored, the spring 58 is insufficient to maintain the pin 32 in engagement with the nut 40 during the cutting operation. Thus, in order to securely lock the shank 26 to the body 12, a set screw 62 is threadably mounted within a transverse bore 64 in the body 12 which perpendicularly intersects the longitudinaly bore 20. The screw 62 engages a flat 66 formed on the shank 26 so that, upon tightening of the screw 62, the screw 62 firmly locks the shank 26 to the body 12.

In the preferred embodiment of the invention, the boring bar is constructed so that, with the nut 40 flush against the annular surface 38 on the body 12, the cutting edge 30 of the cutting tool is positioned to cut slightly less than a standard size hole, for example ½ inch, ¾ inch and the like. The nut 40 is then rotated thus moving the shank 26 outwardly from the body 12 and increasing the size of the bored hole. In addition, an indicia scale 68 (FIG. 1) between the nut 40 and the body 12 is calibrated in predetermined increments, for example 1/1000 of an inch, to facilitate adjustment of the hole diameter.

From the foregoing, it can be seen that the boring bar of the present invention provides a simple, inexpensive and yet wholly effective boring bar which can be easily and accurately adjusted by the user.

Having described my invention, however, many modifications thereto will become apparent to those skilled in the art to which it pertains without deviation from the spirit of the invention as defined by the scope of the appended claims.

I claim:

1. A boring bar comprising:
    a body having two axial ends and adapted to be rotatably driven around a predetermined axis,
    said body having a longitudinally extending bore open to at least one end of said body, said bore having an axis which intersects said predetermined axis at an acute angle,
    a cutting tool having an elongated shank with a cutting edge at one end, the other end of said shank being longitudinally slidably and removably received in one end of said bore at a first end of said body, and
    means insertable into the other end of said bore for both retaining said shank to said body within said bore and for resiliently urging said shank into said one end of said bore,
    a nut threadably secured to said first end of said body,
    means for locking said shank to said body at an adjustable user selected longitudinal position within said bore comprising
    a pin secured to said extending laterally outwardly from said shank, said pin being axially slidably received in a slot formed in said body, said slot being open to said first end of said body, and wherein an axial end of said nut abuts against said pin so that rotation of said nut longitudinally displaces said shank with respect to said body.

2. The invention as defined in claim 1 wherein said resilient urging means comprises a helical compression spring and a screw having a head and extending through said spring and threadably engaging the other end of said shank so that said spring is sandwiched in a state of compression between said screw head and said body.

3. The invention as defined in claim 2 wherein said longitudinal bore is a throughbore having a reduced diameter portion at a midpoint along said body, said reduced diameter portion forming an annular abutment surface which faces the other end of said body, and wherein one end of said spring abuts against said abutment surface.

4. The invention as defined in claim 1 wherein said locking means further comprises a screw threadably secured to a transversely extending bore in said body, said radially extending bore being open to said longitudinal bore.

5. The invention as defined in claim 1 wherein said body includes an indicia scale adjacent said nut.

* * * * *